Sept. 13, 1955          M. LEUPOLD          2,717,447
HINGED TELESCOPE CLAMP
Filed Oct. 12, 1951
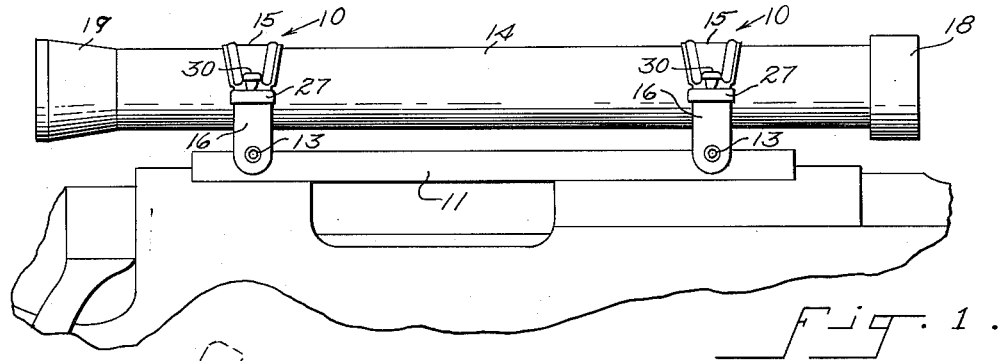
Fig. 1.
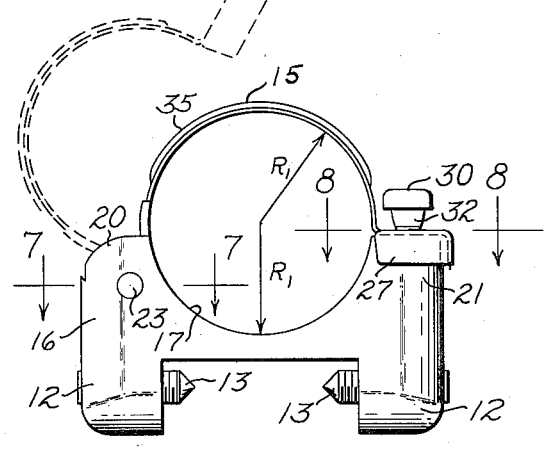
Fig. 2.
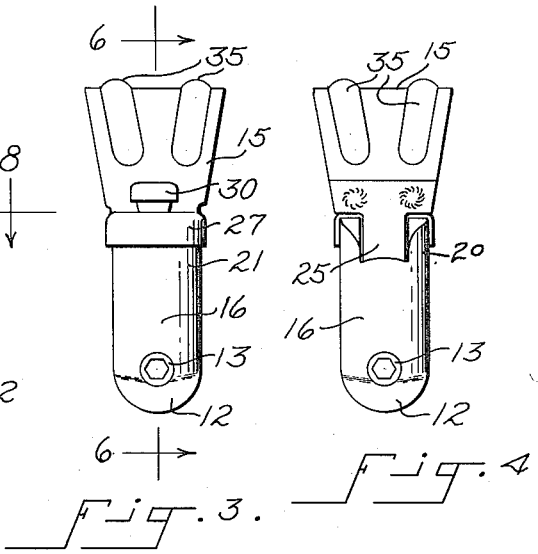
Fig. 3.    Fig. 4.
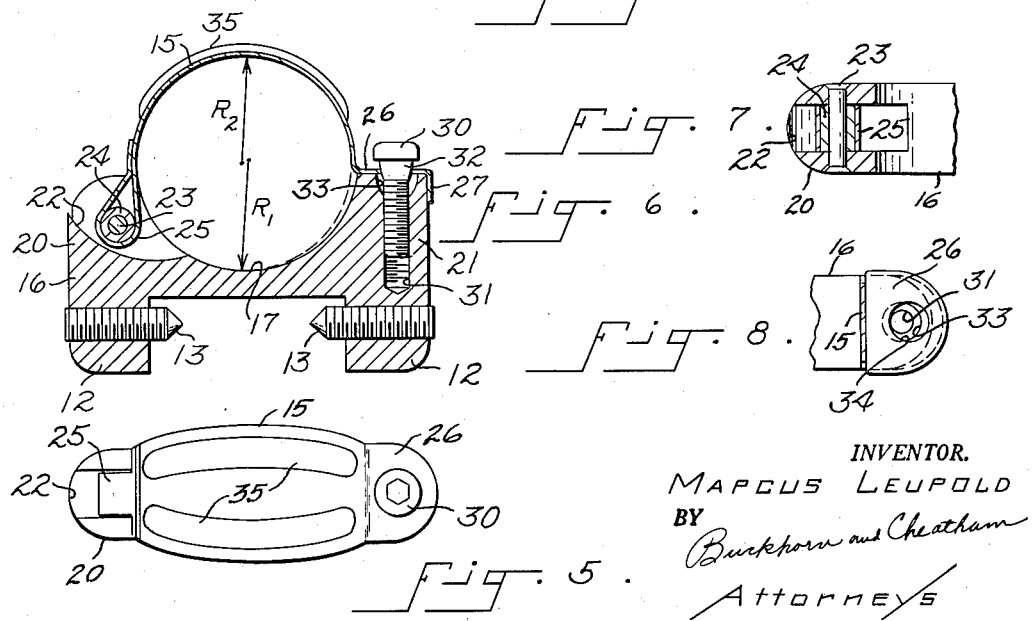
Fig. 6.    Fig. 7.
Fig. 8.
Fig. 5.
INVENTOR.
MARCUS LEUPOLD
BY Buckhorn and Cheatham
Attorneys

United States Patent Office 2,717,447
Patented Sept. 13, 1955

2,717,447

HINGED TELESCOPE CLAMP

Marcus Leupold, Portland, Oreg., assignor to Leupold & Stevens Instruments, Inc., Portland, Oreg., a corporation of Oregon Application October 12, 1951, Serial No. 251,013

5 Claims. (Cl. 33—50)

My present invention relates to telescope clamps, particularly clamps adapted to mount telescopic sights on rifles or other firearms, although the same construction might be used in other instruments employing telescopes.

The principal object of the present invention is to provide a telescope clamp which may be used by any person to associate a telescope with a firearm or the like, as distinguished from the prior practice of sending the rifle to a gunsmith or telescope manufacturer in order to mount the telescope on the rifle. With the present invention all that is necessary is that the mounting bar or other means for attaching the telescope clamps to the rifle be accurately positioned and firmly attached to the rifle, it being within the power of any ordinary individual to associate the telescope clamps with the telescope and to associate the telescope clamps with the mounting bar or equivalent.

A further object of the present invention is to provide a telescope clamp having means whereby the clamp may accommodate itself to the largest and smallest variations in a certain model of telescope as occurs within the tolerances permitted by the manufacturer.

A further object of the present invention is to provide a telescope clamp which may be quickly opened to permit dismounting of a telescope from the rifle in order to protect the telescope from damage in transit, yet which will accurately reposition the telescope in its adjusted alignment when the telescope is reassociated with the rifle.

A further object of the present invention is to provide a telescope clamp which is made of sturdy, economically manufactured materials which may be blued to present an attractive appearance, and which need not be machined to fit a telescope tube during the process of assembling a telescope on a rifle or equivalent.

The present invention may be utilized to its best advantage in association with a telescope mount such as disclosed in my prior Patent No. 2,548,031, issued April 10, 1951, but it is to be appreciated that the invention may be incorporated in almost any practical telescope mount.

The advantages of the present invention will be more fully appreciated upon inspection of the following specification taken in connection with the accompanying drawings wherein like numerals refer to like parts throughout and in which a preferred form of the invention is set forth in detail.

In the drawing,

Fig. 1 is a partial side elevation of a firearm having a telescope mounted thereon by means including the present invention;

Fig. 2 is a side elevation of a clamp incorporating the present invention, the same being on an enlarged scale, and showing the mount set to receive a tube of large diameter;

Fig. 3 is an end elevation taken from the right end of the mount when set to receive a tube of small diameter;

Fig. 4 is an end elevation taken from the left end of the mount;

Fig. 5 is a plan view of the telescope clamp;

Fig. 6 is a vertical section taken substantially along line 6—6 of Fig. 3;

Fig. 7 is a partial horizontal section taken substantially along line 7—7 of Fig. 2; and Fig. 8 is a partial horizontal section taken substantially along line 8—8 of Fig. 2, with the fastening screw removed.

The present invention comprises a telescope clamp indicated generally by the numeral 10, there being two such clamps illustrated in Fig. 1 in association with a mounting bar 11 spanning the receiver portion of a rifle. As illustrated and described in the above identified patent, the telescope clamps each preferably comprise a pair of depending portions 12 which straddle the opposite sides of an elevating adjusting screw (not shown), the clamps being held in position by windage adjustment screws 13. The clamps engage fore and aft portions of a telescope tube 14 and each comprise a hinged upper portion 15 and a lower portion 16, the upper portion being movable to an open position as indicated in dash lines in Fig. 2 to such an extent that the telescope tube may be moved into a receiving notch 17 in the lower portion. By providing separable portions as thus disclosed it is possible to mount a telescope tube having enlargements such as indicated at 18 and 19 on the opposite ends thereof without requiring disassembly of the telescope tube. This is of extreme importance, first, because such tubes must be moisture-free and usually contain an inert gas such as nitrogen, which cannot be replaced by the ordinary gunsmith, and, second, because it saves the surface of the telescope tube and the inner surfaces of the mounting members from having the bluing thereon scratched or marred as is usually the case when a tube is slid lengthwise through the mounts.

The lower member 16 comprises a saddle member having a notch 17 therein preferably of semicylindrical configuration. The ends of the members define buttresses, there being a hinge buttress 20 at one side of the notch and a fastening buttress 21 at the opposite side of the notch. The buttresses preferably rise substantially to the horizontal diameter of a circle defined by the tube-engaging surface of the notch 17.

The hinge buttress 20 is provided with an upwardly and outwardly opening groove 22 defined in part by spaced, parallel, vertical wall surfaces. Hinge means extend transversely of the groove 22, the same preferably comprising a pin 23 extending transversely of the groove and parallel to the axis of the semicylindrical notch 17, the ends of the pin being upset into countersunk ends of the bore in which the pin is located. The pin is surrounded by a pivot spacer or roller 24 which extends from side to side of the groove.

The clamp member 15 preferably comprises a stamping of relatively thin sheet metal including an intermediate portion having surfaces shaped to engage portions of the upper half of a telescope tube laid in the notches 17. One end of the member 15 is doubled back upon itself to provide a relatively large eye 25 embracing the pivot roller 24, the end of the sheet metal being welded or otherwise affixed to the intermedite portion to provide a sturdy construction. One advantage of having a relatively large eye 25 is that a wide bearing surface is thus provided at each end of the eye which may engage the vertical walls of the groove 22 to insure sturdiness and correct alignment of the clamp member whenever it is returned to clamping position.

The free end of the clamp member comprises a tab 26 which extends radially outward and is adapted to engage the upper end of the buttress 21. The tab is provided with a marginal flange 27 which is adapted to partially surround and engage the upper portions of the vertical outer sides of the buttress. As seen most clearly in Fig. 8, the outer portion of the flange 27 is outwardly spaced from the outer portion of the buttress when the clamp member loosely rests upon the top of the buttress, in which position the inner surfaces of the notch 17 and of the clamp member 15 describes a substantially perfect circle, the same having a diameter equal to the diameter of the largest tube which may be received in the clamp.

Separable fastening means are provided to maintain the clamp in closed position, the same comprising a screw 30 adapted to be received in a vertical, threaded bore 31 in the buttress 21. The screw is preferably provided with a wedge shank portion 32, and the upper end of the bore 31 comprises a complementarily shaped countersink 33. When the clamping member rests loosely in position as seen in Fig. 8, an opening 34 in the tab 26 is offset outwardly with respect to the bore 31 and in this position the mount will be firmly fixed about a large diameter tube when the screw is partially seated as seen in Fig. 2. However, if the particular telescope tube should be of lesser diameter, the clamp may nevertheless be drawn up tightly by driving the screw 30 further into the bore, the wedge shank 32 thus forcing the opening 34 more into axial alignment with the bore 31 as indicated in Fig. 6. When this occurs the clamp member 15 will be deformed to conform with a circle of lesser diameter than the diameter of the notch 17, but sufficient pressure can be brought to bear to insure replacement of the telescope tube in the same position at all times. The clamping member is preferably provided with a pair of stiffening ribs as indicated at 35.

Having illustrated and described a preferred embodiment of my invention, it should be apparent to those skilled in the art that the same permits of modification in arrangement and detail. All such modifications as come within the true spirit and scope of the appended claims are considered to be a part of my invention.

I claim:

1. A telescope clamp for mounting a sighting telescope upon a rifle or the like comprising a saddle member adapted to be mounted on a rifle and having an upwardly facing semicylindrical notch therein shaped to engage a surface area of the lower half of a telescope tube placed therein, said saddle member comprising a buttress at each side of said notch, one of said buttresses having an upwardly and outwardly open groove therein extending transversely with respect to said notch, pivot means mounted in said one buttress and extending transversely of said groove, a resilient sheet metal clamp member comprising an intermediate, semicylindrical, downwardly facing portion shaped to engage a surface area of the upper half of a telescope tube placed in said notch, said clamp member having an eye at one end pivotally engaged with said pivot means and having its free end engageable with the upper end of the other of said buttresses, and separable threaded fastening means for affixing said free end to said other buttress and comprising wedge means to force the free end of said clamp member radially inward progressively as it is tightened.

2. A telescope clamp for mounting a sighting telescope upon a rifle or the like comprising a saddle member adapted to be mounted on a rifle and having an upwardly facing notch therein shaped to engage a surface area of the lower half of a telescope tube placed therein, said saddle member comprising a buttress at each side of said notch, one of said buttresses having an upwardly and outwardly open groove therein extending transversely with respect to said notch, pivot means mounted in said one buttress and extending transversely of said groove, a clamp member comprising an intermediate portion shaped to engage a surface area of the upper half of a telescope tube placed in said notch, said clamp member having an eye at one end pivotally engaged with said pivot means and having its free end engageable with the upper end of the other of said buttresses, and separable, screw fastening means affixing said free end to said other buttress, said notch defining a substantially semicylindrical telescope seating surface, said clamping member being formed of relatively thin, resilient sheet metal, said intermediate portion thereof defining a substantially semicylindrical downwardly facing telescope engaging surface having a normal radius substantially equal to the radius of said notch, and said fastening means and clamp member comprising cooperating means to wedge the free end of said clamp member radially inward as said fastening means is tightened.

3. A telescope clamp for mounting a sighting telescope upon a rifle or the like comprising a saddle member adapted to be mounted on a rifle and having an upwardly facing notch therein shaped to engage a surface area of the lower half of a telescope tube placed therein, said saddle member comprising a buttress at each side of said notch, pivot means mounted in one of said buttresses, a clamp member comprising an intermediate portion shaped to engage a surface area of the upper half of a telescope tube placed in said notch, said clamp member having an eye at one end pivotally engaged with said pivot means and having its free end engageable with the upper end of the other of said buttresses, and separable fastening means affixing said free end to said other buttress, said notch defining a substantially semicylindrical telescope seating surface, said clamping member being formed of relatively thin, resilient sheet metal and said intermediate portion thereof defining a substantially semicylindrical, downwardly facing telescope engaging surface, the free end of said clamping member comprising an outwardly extending tab having a marginal flange thereon adapted to partially embrace the opposite side portions of the end of said other buttress, said tab having an opening therethrough, said separable fastening means comprising a headed screw passing through said opening and an internally threaded, vertical bore in said other buttress, and said screw comprising a threaded portion of lesser diameter than said opening and a tapered shank of upwardly increasing diameter.

4. A telescope clamp for mounting a sighting telescope upon a rifle or the like comprising a saddle member adapted to be mounted on a rifle and having an upwardly facing notch therein shaped to engage a surface area of the lower half of a telescope tube placed therein, said saddle member comprising a buttress at each side of said notch, pivot means mounted in one of said buttresses, a clamp member comprising an intermediate deformable portion shaped to engage a surface area of the upper half of a telescope tube placed in said notch, said clamp member being pivotally engaged with said pivot means and having its free end engageable with the upper end of the other of said buttresses, and separable fastening means affixing said free end to said other buttress, said notch defining a substantially semicylindrical telescope seating surface, said intermediate portion defining a substantially semicylindrical telescope engaging surface having a normal radius substantially equal to the radius of said notch, the free end of said clamping member comprising an outwardly extending tab, said tab having an opening therethrough, and said separable fastening means comprising a screw passing through said opening and an internally threaded, vertical bore in said other buttress, said bore being of smaller diameter than said opening, said screw comprising a wedge shank, and said bore having a countersunk upper end, said opening normally being slightly offset outwardly with respect to the axis of said bore whereby the engagement of said wedge shank with said opening is effective to decrease the normal radius of said clamping member.

5. A telescope clamp for mounting a sighting telescope upon a rifle or the like comprising a saddle member adapted to be mounted on a rifle and having an upwardly facing notch therein shaped to engage a surface area of the lower half of a telescope tube placed therein, said saddle member comprising a buttress at each side of said notch, one of said buttresses having an upwardly and outwardly open groove therein extending transversely with respect to said notch, pivot means mounted in said one buttress and extending transversely of said groove, a clamp member comprising an intermediate portion shaped to engage a surface area of the upper half of a telescope tube placed in said notch, said clamp member having an eye at one end pivotally engaged with said pivot means and having its free end engageable with the upper end of the other of said buttresses, and separable fastening means affixing said free end to said other buttress, said notch defining a substantially semicylindrical telescope seating surface, said clamping member being formed of relatively thin, resilient sheet metal and said intermediate portion thereof defining a substantially semicylindrical telescope engaging surface having a normal radius substantially equal to the radius of said notch, the free end of said clamping member comprising an outwardly extending tab having a marginal flange thereon adapted to partially embrace the opposite side walls of the end of said other buttress, said tab having an opening therethrough, and said separable fastening means comprising a headed screw passing through said opening and an internally threaded, vertical bore in said other buttress, said screw comprising a concentric wedge shank and said bore having a complementarily countersunk upper end, said opening being of substantially the same diameter as the mouth of said bore and normally being offset outwardly with respect to the axis of said bore when said tab loosely engages said other buttress, and said wedge shank being effective to align said opening with said bore in order to vary the effective diameter of the clamp.

References Cited in the file of this patent

UNITED STATES PATENTS

| | | |
|---|---|---|
| 880,310 | Klousnitzer | Feb. 25, 1908 |
| 922,072 | Aichman | May 18, 1909 |
| 1,794,410 | Kocourek | Mar. 3, 1931 |
| 2,018,960 | Kuhn | Oct. 29, 1935 |
| 2,165,221 | Burton | July 11, 1939 |
| 2,193,094 | Gilbert | Mar. 12, 1940 |
| 2,449,551 | Garand | Sept. 21, 1948 |
| 2,452,406 | Volkery et al. | Oct. 26, 1948 |

FOREIGN PATENTS

| | | |
|---|---|---|
| 24,036 | Great Britain | Oct. 20, 1909 |